(12) United States Patent
Herve et al.

(10) Patent No.: US 11,090,995 B2
(45) Date of Patent: Aug. 17, 2021

(54) SUSPENSION SYSTEM OF A VEHICLE AXLE

(71) Applicant: Volvo Truck Corporation, Gothenburg (SE)

(72) Inventors: Michel Herve, Lyons (FR); Stéphane Brun, Montceau les Mines (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 66 days.

(21) Appl. No.: 16/490,108

(22) PCT Filed: May 15, 2017

(86) PCT No.: PCT/IB2017/000731
§ 371 (c)(1),
(2) Date: Aug. 30, 2019

(87) PCT Pub. No.: WO2018/211298
PCT Pub. Date: Nov. 22, 2018

(65) Prior Publication Data
US 2020/0001675 A1 Jan. 2, 2020

(51) Int. Cl.
*B60G 11/04* (2006.01)
*B60G 11/107* (2006.01)
(Continued)

(52) U.S. Cl.
CPC ............ *B60G 11/04* (2013.01); *B60G 11/107* (2013.01); *B60G 11/113* (2013.01);
(Continued)

(58) Field of Classification Search
CPC ............ B60G 11/113; B60G 2204/121; B60G 11/107; B60G 2200/13; B60G 2202/112; F16F 1/26
(Continued)

(56) References Cited

U.S. PATENT DOCUMENTS 5,938,221 A * 8/1999 Wilson .................. B60G 11/10
267/260
6,015,158 A 1/2000 Overby
(Continued)

FOREIGN PATENT DOCUMENTS

DE 2758721 A1 7/1979
WO 9929526 A1 6/1999

OTHER PUBLICATIONS

International Search Report and Written Opinion for International Patent Application No. PCT/IB2017/000731, dated Feb. 7, 2018, 13 pages.

*Primary Examiner* — Paul N Dickson
*Assistant Examiner* — Daniel M. Keck
(74) *Attorney, Agent, or Firm* — Withrow & Terranvoa PLLC

(57) ABSTRACT

The invention relates to a suspension system of a vehicle axle, comprising: a leaf spring (11); a rear attachment device (24) configured to be secured to a vehicle frame (2) and comprising two parallel walls (40) spaced apart along a transverse direction by a distance (d). A rear end portion (14) of the leaf spring (11) is received in the rear attachment device (24), between said walls (40), and is capable of sliding longitudinally relative to the rear attachment device. The leaf spring rear end portion (14) has a first width (w1) which is smaller than the distance (d), and the leaf spring (11) has a second width (w2) which is greater than the distance (d), at least in a blocking portion (30) of the leaf spring (11) located forward of the rear end portion (14).

9 Claims, 2 Drawing Sheets

(51) Int. Cl.
 *B60G 11/113* (2006.01)
 *F16F 1/26* (2006.01)
(52) U.S. Cl.
 CPC .... *B60G 2200/13* (2013.01); *B60G 2202/112* (2013.01); *B60G 2204/121* (2013.01); *B60G 2206/601* (2013.01)
(58) Field of Classification Search
 USPC .................................................. 280/124.175
 See application file for complete search history.

(56) References Cited

U.S. PATENT DOCUMENTS

| | | | | |
|---|---|---|---|---|
| 6,485,040 | B1* | 11/2002 | Dudding | B60G 11/12 267/270 |
| 6,619,637 | B1* | 9/2003 | Juriga | B60G 11/12 267/262 |
| 2007/0267790 | A1* | 11/2007 | Furman | B60G 11/107 267/36.1 |
| 2009/0115147 | A1 | 5/2009 | Zuurbier et al. | |

* cited by examiner

SUSPENSION SYSTEM OF A VEHICLE AXLE

This application is a 35 USC 371 national phase filing of International Application No. PCT/IB2017/000731, filed May 15, 2017, the disclosure of which is incorporated herein by reference in its entirety.

TECHNICAL FIELD

The invention relates to a suspension system of a vehicle axle.

The invention can be applied in heavy-duty vehicles, such as trucks, buses and construction equipment, but is not restricted to these vehicles.

BACKGROUND

A conventional suspension for a vehicle includes a leaf spring, made of one leaf or several superimposed leaves, which is arranged longitudinally adjacent and under a frame girder of the vehicle.

There are provided a front attachment device and a rear attachment device, both secured to the vehicle frame. The leaf spring front end portion is engaged in the front attachment device, generally with no degree of freedom along the longitudinal direction, while the leaf spring rear end portion is engaged in the rear attachment device so as to be able to slide longitudinally relative to the rear attachment device. Furthermore, the leaf spring comprises an intermediate portion engaged in an intermediate attachment device for attaching the vehicle axle to the vehicle frame.

For weight and cost reasons, single leaf springs made of a single leaf are more advantageous than those comprising several leaves. However, in the event of a leaf spring break, no leaf remains to ensure the vehicle safety.

More specifically, if the leaf spring breaks at its front portion, it is no more maintained in the longitudinal direction. As a result, the vehicle axle connected to the suspension system is not maintained either in the longitudinal direction, which poses serious problems in terms of safety.

Therefore, there is a need for an improved suspension system of a vehicle axle.

SUMMARY

An object of the invention is to provide a suspension system of a vehicle axle which is improved in terms of safety, and especially which ensures the vehicle can be at least stopped safely in case the leaf spring has been broken.

To that end, according to a first aspect, the invention concerns a suspension system of a vehicle axle, comprising a leaf spring having a longitudinal axis and a transverse axis, the suspension system comprising a rear attachment device which is configured to be secured to a vehicle frame, the rear attachment device comprising two walls which are substantially orthogonal to the transverse axis and spaced apart along said transverse axis by a distance (d), a rear end portion of the leaf spring being received in the rear attachment device, between said walls, and being capable of sliding longitudinally relative to the rear attachment device, wherein the leaf spring rear end portion has a first width (w1), along the transverse axis, which is smaller than the distance (d), and the leaf spring has a second width (w2), along the transverse axis, which is greater than the distance (d), at least in a blocking portion of the leaf spring located forward of the rear end portion.

Thus, in normal conditions, the leaf spring can be secured to the vehicle frame at its front end portion and can slide longitudinally relative to the vehicle frame at its rear end portion, forward, in order to accommodate the axle vertical movements.

Furthermore, in case the leaf spring breaks forward of the axle, the leaf spring—and therefore the axle—remains at least partially maintained in the longitudinal direction. Indeed, insofar as the leaf spring width is increased in the forward direction, a rearward movement of the leaf spring, relative to the rear attachment device, is not possible because the walls of the rear attachment device are too close to allow the wider portion of the leaf spring to pass between them.

In other words, the axle is prevented from moving rearward above a predetermined limit. This ensures the driver can at least stop the vehicle safely. This advantage is obtained with an arrangement which is simple to manufacture and implement, the invention therefore providing a cost effective solution.

The invention is particularly favourable for a suspension system which comprises a single leaf spring, i.e. no back-up leaf for ensuring the system safety.

The first width can be slightly smaller than the distance (d), so as to ensure sufficient guidance of the leaf spring longitudinal movement in the rear attachment device.

The blocking portion can be substantially adjacent the leaf spring rear end portion. In other words, in this embodiment, the leaf spring comprises no transition portion, or a transition portion having a length which is very small compared to the leaf spring length (for example less than 5%, or even less than 1%).

In an embodiment, the leaf spring comprises a transition portion between the blocking portion and the leaf spring rear end portion, in which the width progressively decreases rearward from the second width to the first width. The side edges of this transition portion can be substantially linear and symmetrical with respect to the leaf spring median plane which is orthogonal to the transverse axis.

The leaf spring may have a substantially constant width equal to the second width along its entire length, except in its rear end portion and possibly in its transition portion.

Besides, the leaf spring can be substantially flat, except possibly in its front end portion.

The suspension system may further comprise a pad which is secured on the rear attachment device and which is in contact with the upper face of the leaf spring rear end portion.

In an embodiment, the suspension system can comprise a front attachment device configured to be secured to the vehicle frame and an intermediate attachment device, the leaf spring comprising a front end portion, preferably loop-shaped, which is engaged in said front attachment device and an intermediate portion engaged in said intermediate attachment device for attaching the vehicle axle to the vehicle frame.

According to a second aspect, the invention concerns a vehicle comprising a frame, an axle, and a suspension system as previously described.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
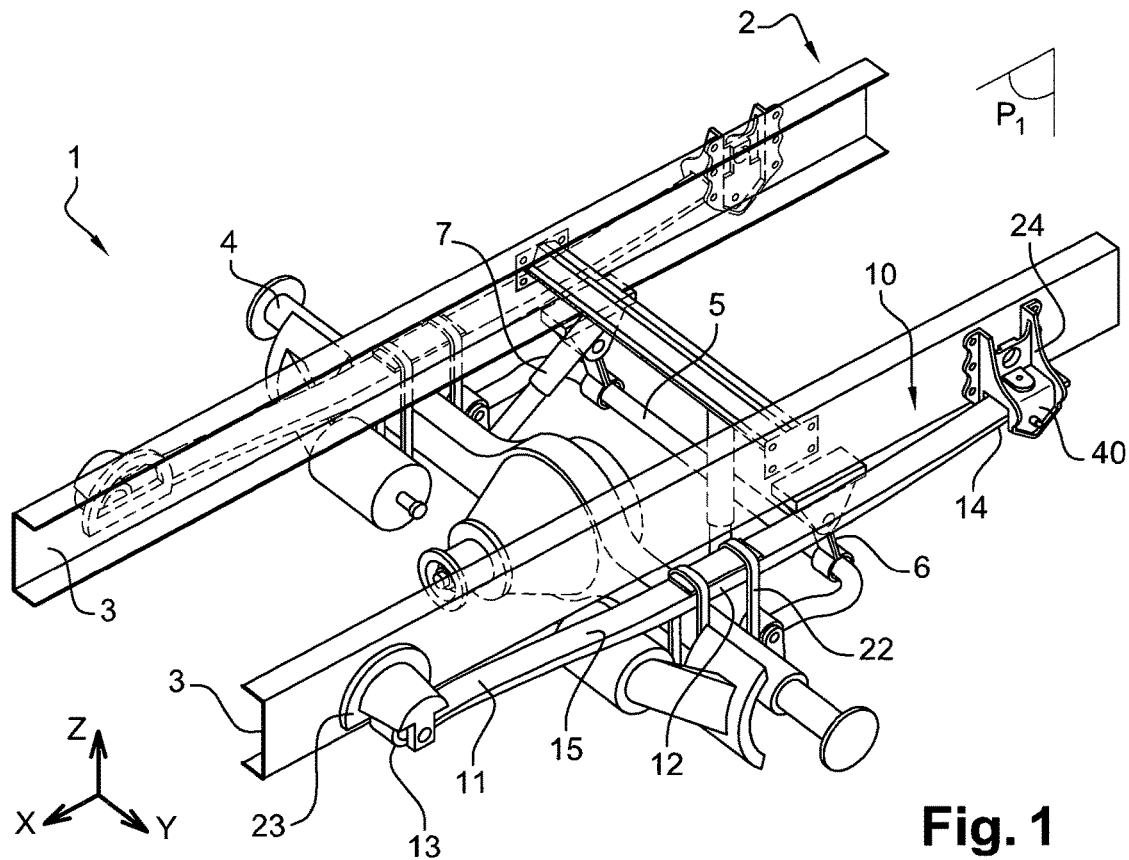
FIG. 1 is a partial perspective view of a vehicle, showing a frame, an axle, and a suspension system of the axle.

FIG. 1 is a partial view of a vehicle 1 comprising a frame 2 including two girders 3, and an axle 4 mounted on the frame 2.

The longitudinal direction X is defined as the longitudinal direction of the vehicle 1 and of the girders 3. The transverse direction Y is the direction of the axle 4, and Z is the vertical direction.

The mounting assembly between the axle 4 and the frame includes a stabilizer bar 5 secured to the frame 2 by means of stabilizer rods 6, at least one cylinder 7, and a suspension system 10 which will now be described.

The suspension system 10 being substantially symmetrical with respect to the vehicle median longitudinal plane P1, only one side of the suspension system 10 will be described.

Figure 5:
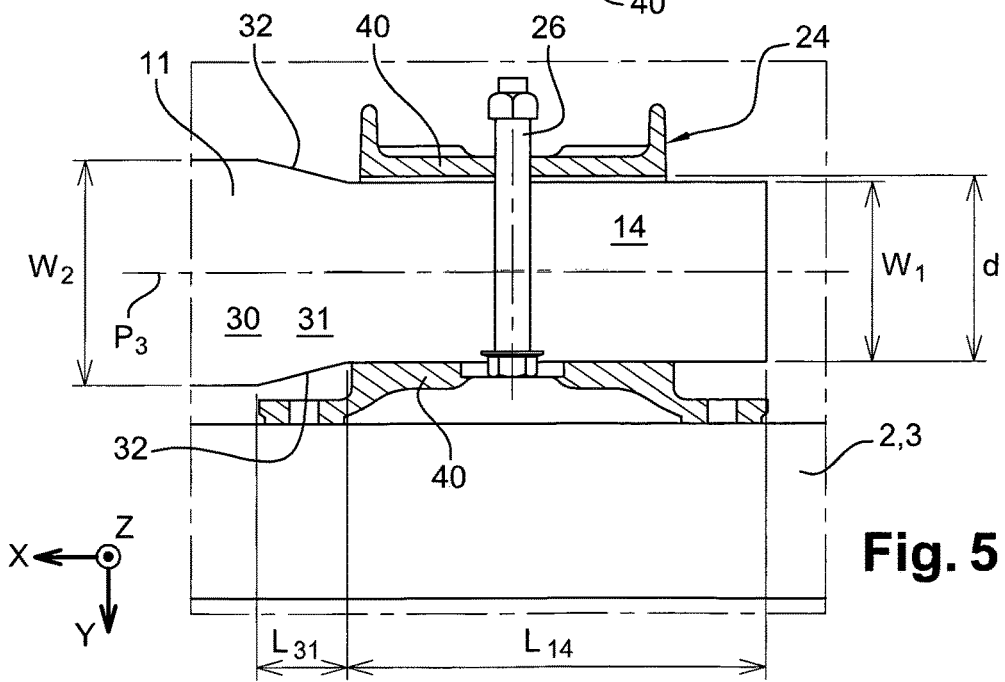

The suspension system 10 comprises a leaf spring 11 which is preferably a single leaf spring. The leaf spring 11 extends longitudinally along the outer face of the corresponding girder 3, near the lower edge of said girder 3. The leaf spring 11, which can typically be made of metal such as steel, is a substantially flat piece lying in a plane P2, except at its front end portion, and has a substantially horizontal upper face 15 (when the vehicle is on a horizontal ground). As shown in FIG. 5, the leaf spring 11 has a median plane P3 which is orthogonal to the transverse direction Y, and which is a symmetry axis of said leaf spring 11.

The leaf spring 11 comprises an intermediate portion 12 engaged in an intermediate attachment device 22 which supports the axle 4. The leaf spring 11 also comprises a front end portion 13 engaged in a front attachment device 23 and a rear end portion 14 engaged in a rear attachment device 24, the front and rear attachment devices 23, 24 being secured to the vehicle frame 2, for example on the outer surface of the corresponding girder 3.

Figure 3:
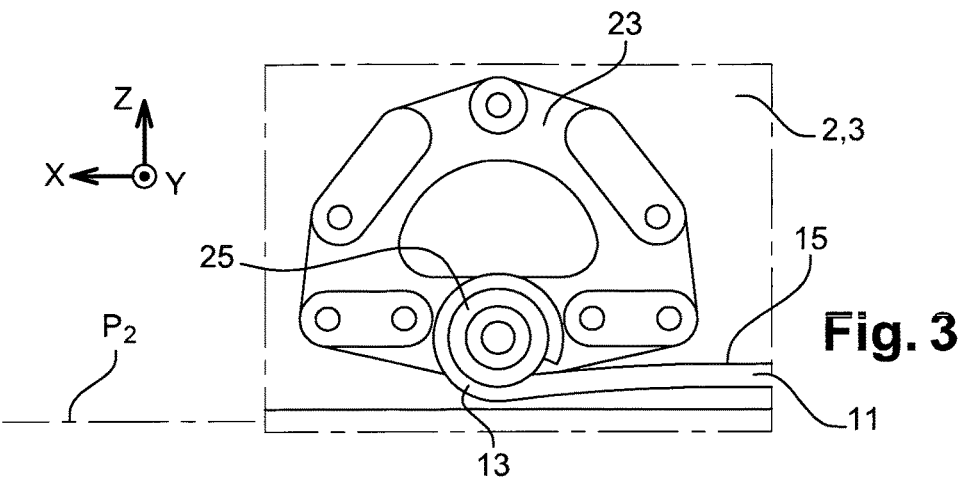
FIG. 3 is an enlarged side view of the front end portion of the suspension system of FIG. 1.

As can be seen on FIG. 3, the front end portion 13 can have the shape of a loop rolled around a transverse axis can be arranged around a bushing 25 connected to the front attachment device 23. With such an arrangement, the front end portion 13 of the leaf spring 11 cannot move longitudinally relative to the front attachment device 23, i.e. relative to the frame 2. The front end portion 13 is rolled above the leaf spring 11 and can be located above the plane P2. It is underlined that, in FIG. 3, only the part of the front attachment device 23 fastened to the frame 2 is illustrated, to show the front end portion 13 of the leaf spring 11. However, as can be seen on FIG. 1, the front attachment device 23 also comprises an outer part to form a housing for the leaf spring front end portion 13.

On the contrary, the suspension system 10 is configured so that the leaf spring rear end portion 14 can slide longitudinally relative to the rear attachment device 24, in the forward direction, in order to accommodate the vertical movements of the axle 4.

Figure 2:
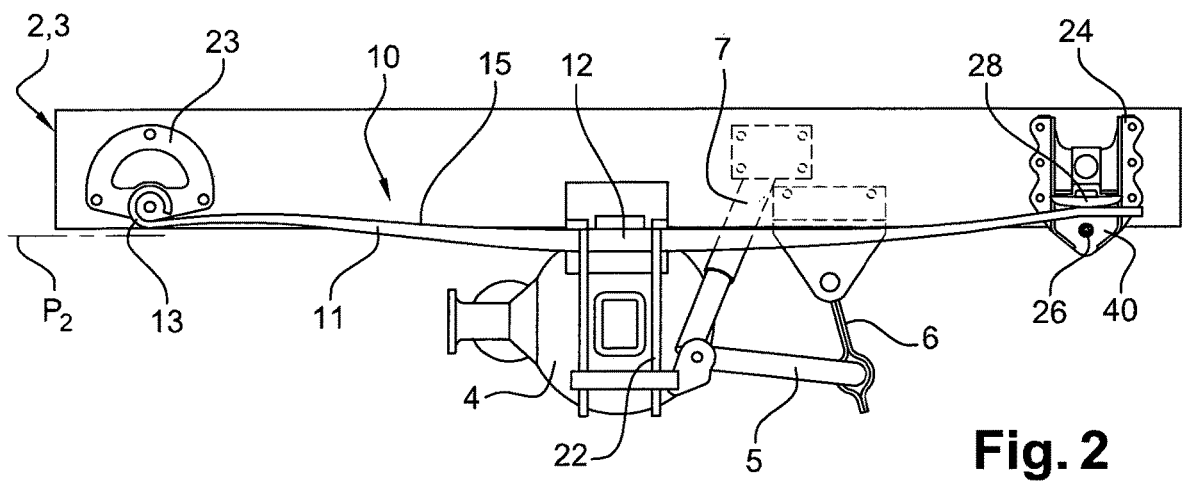
FIG. 2 is a side view of FIG. 1.

The rear attachment device 24 comprises two walls 40 which are substantially orthogonal to the transverse direction Y and which are spaced apart along said transverse direction Y by a distance d, as can be seen in FIG. 5. A fastener 26, preferably equipped with a bushing 27, extends substantially transversally between the walls 40. It has to be noted that, in FIGS. 2 and 4, only the wall 40 of the rear attachment device 24 that is fastened to the frame 2 is illustrated, to show the rear end portion 14 of the leaf spring 11.

The leaf spring rear end portion 14 is received in the rear attachment device 24 between said walls 40. The leaf spring rear end portion 14 has a first width w1 which is smaller than the distance d, to allow the longitudinal movement of the leaf spring 11 relative to the rear attachment device 24. Preferably, w1 is slightly smaller than d, in order to improve the guidance of said movement.

Furthermore, a pad 28 is secured on the rear attachment device 24 and is in contact with the upper face 15 of the leaf spring rear end portion 14. This upper face 15 can be substantially flat, therefore increasing and improving the contact with the pad 28, or any other appropriate member of the rear attachment device 24.

More generally, the leaf spring 11 can be substantially flat along its entire length, except possibly in its front end portion 13 which, in the illustrated embodiment, is loop-shaped.

Figure 4:
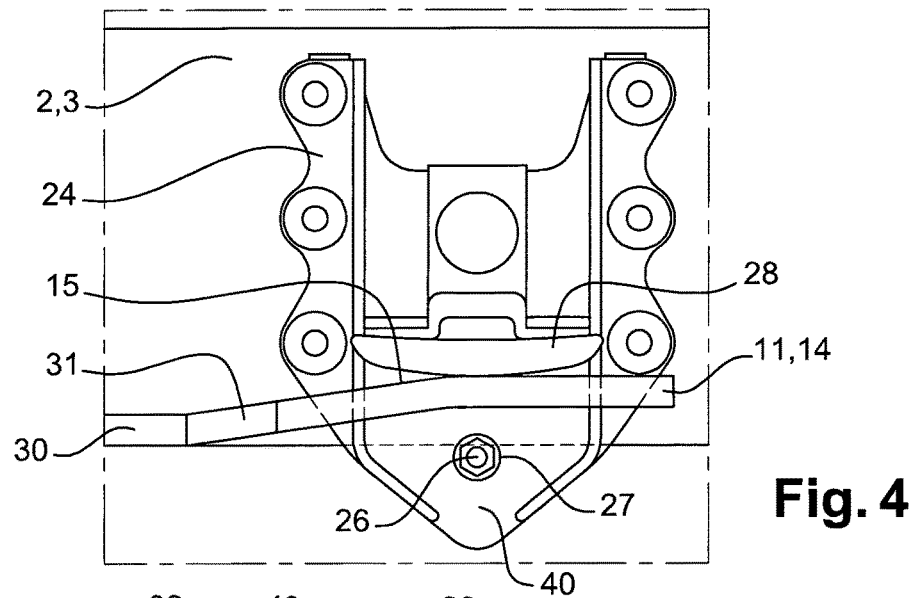
FIGS. 4 and 5 are schematic enlarged views of the rear end portion of the suspension system of FIG. 1, respectively from a side and from below.

In FIG. 4, the leaf spring 11 forms an angle near the pad 28. This angle is not in practice as sharp as shown in FIG. 4 and is not necessarily near the pad, it could be longitudinally forward to the pad. This angle results in the height difference between the vehicle frame and the vehicle axle. Each type of vehicle has its specifications in terms of frame height, suspension height, axle height, but for each vehicle the leaf spring 11 has to get in contact with the pad 28 whatever the height difference between the vehicle frame and the vehicle axle is.

In normal use, thanks to the vehicle's total load, the rear end portion 14 of the leaf spring 11 remains in contact with the pad 28. Indeed, the action between the force exerted by the load applied vertically downwards from the top of the frame 2 and the force exerted from the ground via the wheels enables a permanent contact between the leaf spring 11 and the pad 28.

In very particular cases e.g. holes on the road, or when the vehicle frame is raised e.g. using a hanging bridge for maintenance purpose, there is a moment in time during which there is no force exerted from the ground and the action is therefore lost.

In these particular cases, the movement being essentially vertical, the fastener 26 ensures that the rear end portion 14 of the leaf spring 11 is maintained in the rear attachment device 24.

Thus, the leaf spring rear end portion 14 can move longitudinally relative to the rear attachment device 24, in the forward direction, the leaf spring upper face 15 sliding against the pad 28. To ensure the vehicle safety, especially in case the leaf spring 11 is broken at its front portion and therefore is no more maintained longitudinally in the front attachment device 23, the invention provides a solution for preventing the rearward longitudinal movement of the leaf spring 11 relative to the rear attachment device 24, or at least for limiting it below a predetermined limit.

To that end, as can be seen in FIG. 5, the leaf spring comprises a blocking portion 30 which is located forward of the rear end portion 14, and which has a second width w2 greater than the distance d. A transition portion 31 can be provided between the blocking portion 30 and the rear end portion 14 of the leaf spring 11, in which the width progressively decreases rearward from the second width w2 to the first width w1. The side edges 32 of this transition portion 31 can be substantially linear and symmetrical with respect to the plane P3. However, other configurations are possible.

Alternatively, the transition portion 31 could form a radial surface between the blocking portion 30 and the rear end portion 14. In such an implementation, the leaf spring width would sharply decrease from w2 to w1.

Owing to the invention, the rearward movement of the leaf spring 11 relative to the rear attachment device 24 is prevented as soon as the width of the leaf spring area located at the front part of the walls 40 is greater than the distance d between said walls 40. This leaf spring area can typically be in the blocking portion 30.

In an embodiment, as shown in FIG. 1, the leaf spring 11 has a substantially constant width equal to the second width w2 along its entire length, except in its rear end portion 14, where the width is equal to the first width w1, and in its transition portion 31 if it exists.

For instance, the length L14 of the leaf spring rear end portion 14 can be around 8-15% of the leaf spring overall length, while the length L31 of the transition portion 31 can be less than 5%, or even less than 1% of the leaf spring overall length. With such an arrangement, the blocking portion 30 is substantially adjacent the leaf spring rear end portion 14. As a consequence, only a very small rearward movement of the leaf spring 11 is possible, relative to the vehicle frame 2.

In an embodiment not shown, the leaf spring rear end portion 14 can be curved downward instead of being substantially flat. Such a curved rear surface can form a hook capable of cooperating with the fastener 26 for preventing a forward movement of the leaf spring 11 relative to the vehicle frame 2, or limit this forward movement below a predetermined limit. Preventing the axle 4 from moving forward—above a predetermined limit—can allow the driver to move the vehicle 1 along some distance, typically to park it safely on the side of the road.

It is to be understood that the present invention is not limited to the embodiments described above and illustrated in the drawings; rather, the skilled person will recognize that many changes and modifications may be made within the scope of the appended claims.

The invention claimed is:

1. A suspension system of a vehicle axle, comprising a leaf spring having a longitudinal axis and a transverse axis, the suspension system comprising a rear attachment device which is configured to be secured to a vehicle frame, the rear attachment device comprising two walls which are substantially orthogonal to the transverse axis and spaced apart along said transverse axis by a distance, a rear end portion of the leaf spring being received in the rear attachment device, between said walls, and being capable of sliding longitudinally relative to the rear attachment device, characterized in that the leaf spring rear end portion has a first width, along the transverse axis, which is smaller than the distance, and in that the leaf spring has a second width, along the transverse axis, which is greater than the distance, at least in a blocking portion of the leaf spring located forward of the rear end portion.

2. The suspension system according to claim 1, characterized in that it comprises a single leaf spring.

3. The suspension system according to claim 1, characterized in that the first width is smaller than the distance.

4. The suspension system according to claim 1, characterized in that the blocking portion is longitudinally adjacent the leaf spring rear end portion.

5. The suspension system according to claim 1, characterized in that the leaf spring comprises a transition portion between the blocking portion and the leaf spring rear end portion, in which the width progressively decreases rearward from the second width to the first width.

6. The suspension system according to claim 1, characterized in that the leaf spring has a substantially constant width equal to the second width along its entire length, except in its rear end portion and possibly in its transition portion.

7. The suspension system according to claim 1, characterized in that the leaf spring is substantially flat, except possibly in its front end portion.

8. The suspension system according to claim 1, characterized in that it further comprises a pad which is secured on the rear attachment device and which is in contact with an upper face of the leaf spring rear end portion.

9. The suspension system according to claim 1, characterized in that it further comprises a front attachment device configured to be secured to the vehicle frame and an intermediate attachment device, the leaf spring comprising a front end portion, preferably loop-shaped, which is engaged in said front attachment device and an intermediate portion engaged in said intermediate attachment device for attaching the vehicle axle to the vehicle frame.

* * * * *